United States Patent
Thorisson et al.

(10) Patent No.: US 11,468,637 B2
(45) Date of Patent: Oct. 11, 2022

(54) METHODS AND SYSTEMS FOR PATH-BASED LOCOMOTION IN VIRTUAL REALITY

(71) Applicant: ALDIN DYNAMICS, EHF., Reykjavik (IS)

(72) Inventors: Hrafn Thorri Thorisson, Reykjavik (IS); Pall Arinbjarnar, Hafnarfjordur (IS); Gunnar Steinn Valgardsson, Reykjavik (IS)

(73) Assignee: ALDIN DYNAMICS, EHF., Reykjavik (IS)

( * ) Notice: Subject to any disclaimer, the term of this patent is extended or adjusted under 35 U.S.C. 154(b) by 367 days.

(21) Appl. No.: 16/166,395

(22) Filed: Oct. 22, 2018

(65) Prior Publication Data

US 2019/0122433 A1 Apr. 25, 2019

Related U.S. Application Data

(60) Provisional application No. 62/575,679, filed on Oct. 23, 2017.

(51) Int. Cl.
| | |
|---|---|
| *G06T 19/00* | (2011.01) |
| *G06F 3/01* | (2006.01) |
| *G06F 3/04815* | (2022.01) |
| *A63F 13/573* | (2014.01) |
| *A63F 13/56* | (2014.01) |

(52) U.S. Cl.
CPC .......... *G06T 19/003* (2013.01); *A63F 13/573* (2014.09); *G06F 3/011* (2013.01); *G06F 3/04815* (2013.01); *A63F 13/56* (2014.09); *A63F 2300/8082* (2013.01)

(58) Field of Classification Search
None
See application file for complete search history.

(56) References Cited

U.S. PATENT DOCUMENTS

| | | | |
|---|---|---|---|
| 7,746,343 B1* | 6/2010 | Charaniya | G06F 3/04815 345/428 |
| 10,373,342 B1* | 8/2019 | Perez, III | G06F 3/0346 |
| 2004/0017404 A1* | 1/2004 | Schileru-Key | G06F 3/04815 715/854 |

(Continued)

OTHER PUBLICATIONS

International Search Report and the Written Opinion of the International Searching Authority from corresponding PCT/IB2018/058210 dated Feb. 20, 2019.

(Continued)

*Primary Examiner* — Jennifer Mehmood
*Assistant Examiner* — Jed-Justin Imperial
(74) *Attorney, Agent, or Firm* — Lando & Anastasi, LLP

(57) ABSTRACT

Aspects of the present disclosure provide a method of navigating a Virtual Reality (VR) environment. The method includes providing the VR environment, receiving, from a user, inputs indicative of a user-drawn path in the VR environment, the user-drawn path originating at a position of the user and terminating at a terminal point in the VR environment, generating a plurality of waypoints along the user-drawn path, moving the user to a first waypoint of the plurality of waypoints, pausing the user at the first waypoint, and moving, responsive to a criterion being met, the user to a second waypoint of the plurality of waypoints.

15 Claims, 10 Drawing Sheets

(56) References Cited

U.S. PATENT DOCUMENTS

| | | | |
|---|---|---|---|
| 2006/0089794 A1* | 4/2006 | DePasqua | G01C 21/203 |
| | | | 701/532 |
| 2007/0276709 A1 | 11/2007 | Trimby et al. | |
| 2012/0208639 A1* | 8/2012 | Reynolds | G06F 3/0488 |
| | | | 463/36 |
| 2014/0006631 A1* | 1/2014 | Meskauskas | G06T 11/60 |
| | | | 709/227 |

OTHER PUBLICATIONS

Fredriksen, Jan-Harald, "Middleware Solutions for Artificial Intelligence in Computer Games", Norwegian University of Science and Technology, Faculty of Information Technology, Mathematics and Electrical Engineering, Department of Computer of Information Science, pp. 1-89 (Nov. 27, 2003), XP0002788585, URL: http://www.idi.ntnu.no/grupper/su/fordypningsprosjekt-2003-Jan-Harald-Fredriksen.pdf (retrieved Feb. 4, 2019).

* cited by examiner

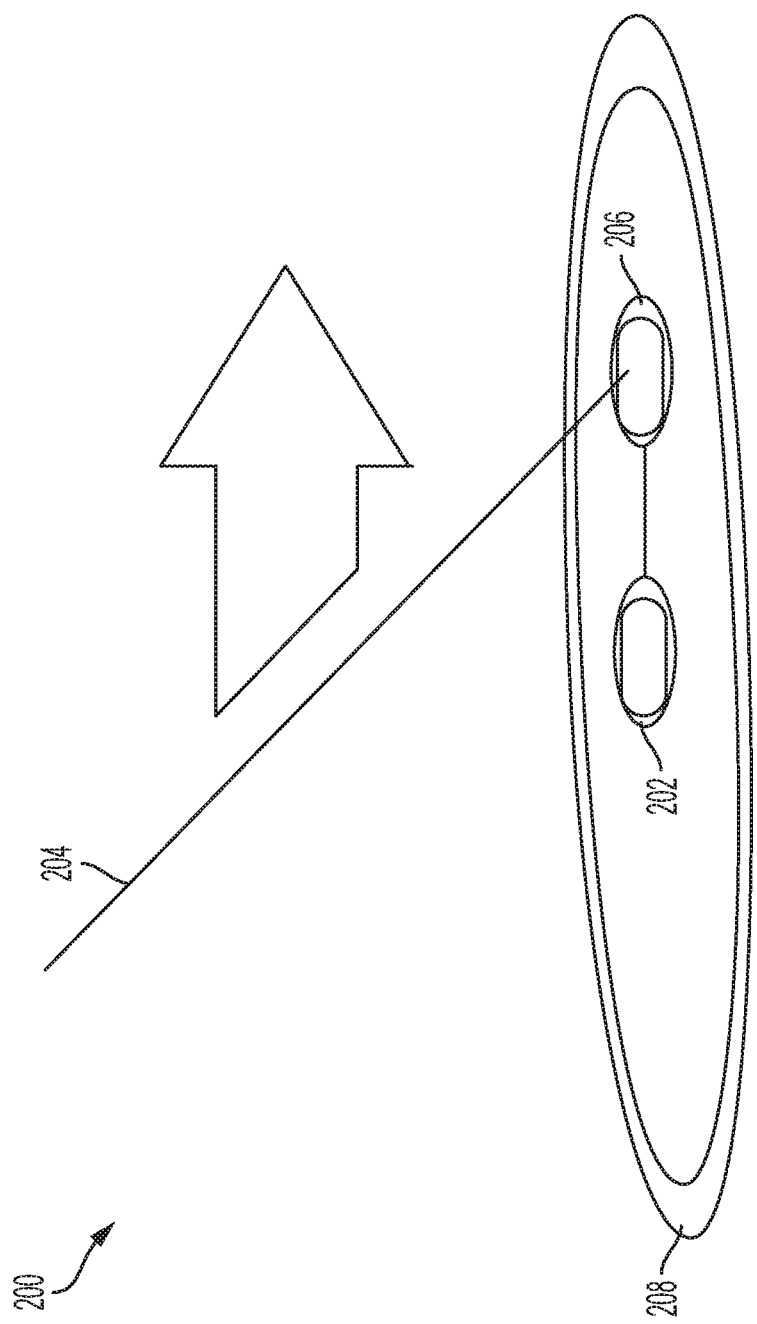

METHODS AND SYSTEMS FOR PATH-BASED LOCOMOTION IN VIRTUAL REALITY

CROSS-REFERENCE TO RELATED APPLICATIONS

This application claims priority to U.S. Provisional Application Ser. No. 62/575,679, titled "METHODS AND SYSTEMS FOR PATH-BASED LOCOMOTION IN VIRTUAL REALITY," filed on Oct. 23, 2017, which is incorporated herein by reference in its entirety.

BACKGROUND

1. Technical Field

This disclosure relates generally to virtual reality systems.

2. Discussion of Related Art

Virtual Reality (VR) entertainment systems are generally known. VR refers to the immersion of a user in a computer-generated environment. VR systems are particularly popular in the entertainment industry. For example, VR systems are particularly popular in the video game industry.

SUMMARY

According to at least one aspect, a method of navigating a Virtual Reality (VR) environment is provided, the method comprising providing the VR environment, receiving, from a user, inputs indicative of a user-drawn path in the VR environment, the user-drawn path originating at a position of the user and terminating at a terminal point in the VR environment, generating a plurality of waypoints along the user-drawn path, moving the user to a first waypoint of the plurality of waypoints, pausing the user at the first waypoint, and moving, responsive to a criterion being met, the user to a second waypoint of the plurality of waypoints.

In one embodiment, the method further comprises sequentially moving the user to a first subsequent waypoint of the plurality of waypoints, pausing the user at the first subsequent waypoint, and moving, responsive to the criterion being met, the user to a second subsequent waypoint until the user is moved to the terminal point. In an embodiment, the criterion being met includes at least one of determining that an amount of time has elapsed, and receiving a user input to move to a next waypoint.

In some embodiments, the method includes receiving, before the criterion has been met, input from a user indicative of an interaction with an entity in the VR environment. In an embodiment, receiving the inputs from the user indicative of the user-drawn path includes receiving, from a user input device, a location input indicative of a position on a surface of the VR environment, and wherein generating the plurality of waypoints includes determining that the position on the surface is above a threshold distance from a most-recently generated waypoint, and generating an additional waypoint at the position on the surface. In some embodiments, receiving, from the user input device, the location input includes receiving, from a handheld motion controller, the location input. In embodiments, moving the user includes dashing the user.

According to some aspects, a system for navigating a VR environment is provided, the system comprising a display configured to display a view of the VR environment, a user input device, and a controller coupled to the display and the user input device. The controller is configured to generate the VR environment, receiving, from the user input device, inputs indicative of a user-drawn path in the VR environment, the user-drawn path originating at a position of the user and terminating at a terminal point, generate a plurality of waypoints along the user-drawn path, control the display to move the view of the VR environment to a first waypoint of the plurality of waypoints, control the display to pause the view of the VR environment at the first waypoint, and control the display, responsive to determining that a criterion has been met, to move the view of the VR environment to a second waypoint of the plurality of waypoints.

In an embodiment, the controller is further configured to control the display to sequentially move the view of the VR environment to a first subsequent waypoint of the plurality of waypoints, pause the user at the first subsequent waypoint, and move, responsive to determining that the criterion has been met, the user to a second subsequent waypoint until the view of the VR environment is moved to the terminal point. In some embodiments, determining that the criterion has been met includes at least one of determining that an amount of time has elapsed, and receiving, from the user input device, a user input to move to a next waypoint.

In one embodiment, the controller is further configured to receive, before the criterion has been met, an interaction input from a user indicative of an interaction with an entity in the VR environment. In an embodiment, receiving the inputs includes receiving, from the user input device, a location input indicative of a position on a surface of the VR environment, and wherein generating the plurality of waypoints includes determining that the position on the surface is above a threshold distance from a most-recently generated waypoint, and generating an additional waypoint at the position on the surface. In some embodiments, the user input device includes at least one of a handheld motion controller and a motion capture device.

According to one aspect, a non-transitory computer-readable medium storing sequences of computer-executable instructions for navigating a VR environment is provided, the sequences of computer-executable instructions including instructions that instruct at least one processor to provide the VR environment, receive, from a user, inputs indicative of a user-drawn path in the VR environment, the user-drawn path originating at a position of the user and terminating at a terminal point, generate a plurality of waypoints along the user-drawn path, move the user to a first waypoint of the plurality of waypoints, pause the user at the first waypoint, and move, responsive to a criterion being met, the user to a second waypoint of the plurality of waypoints.

In one embodiment, the sequences of computer-executable instructions are further configured to instruct at least one processor to sequentially move the user to a first subsequent waypoint of the plurality of waypoints, pause the user at the first subsequent waypoint, and move, responsive to the criterion being met, the user to a second subsequent waypoint until the user is moved to the terminal point. In some embodiments, the criterion being met includes at least one of determining, by the processor, that an amount of time has elapsed, and receiving a user input to move to a next waypoint. In embodiments, the at least one processor is further configured to receive, before the criterion has been met, an interaction input from a user indicative of an interaction with an entity in the VR environment.

In at least one embodiment, receiving the inputs from the user indicative of the user-drawn path includes receiving, from a user input device, a location input indicative of a position on a surface of the VR environment, and wherein the instructions that instruct at least one processor to generate the plurality of waypoints include instructions that instruct the at least one processor to determine that the position on the surface is above a threshold distance from a most-recently generated waypoint, and generate an additional waypoint at the position on the surface. In an embodiment, receiving, from the user input device, the location input includes receiving, from a handheld motion controller, the location input. In some embodiments, moving the user includes dashing the user.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 2A illustrates an aspect of a user interface showing generation of a waypoint according to an embodiment;

DETAILED DESCRIPTION

Figure 1:
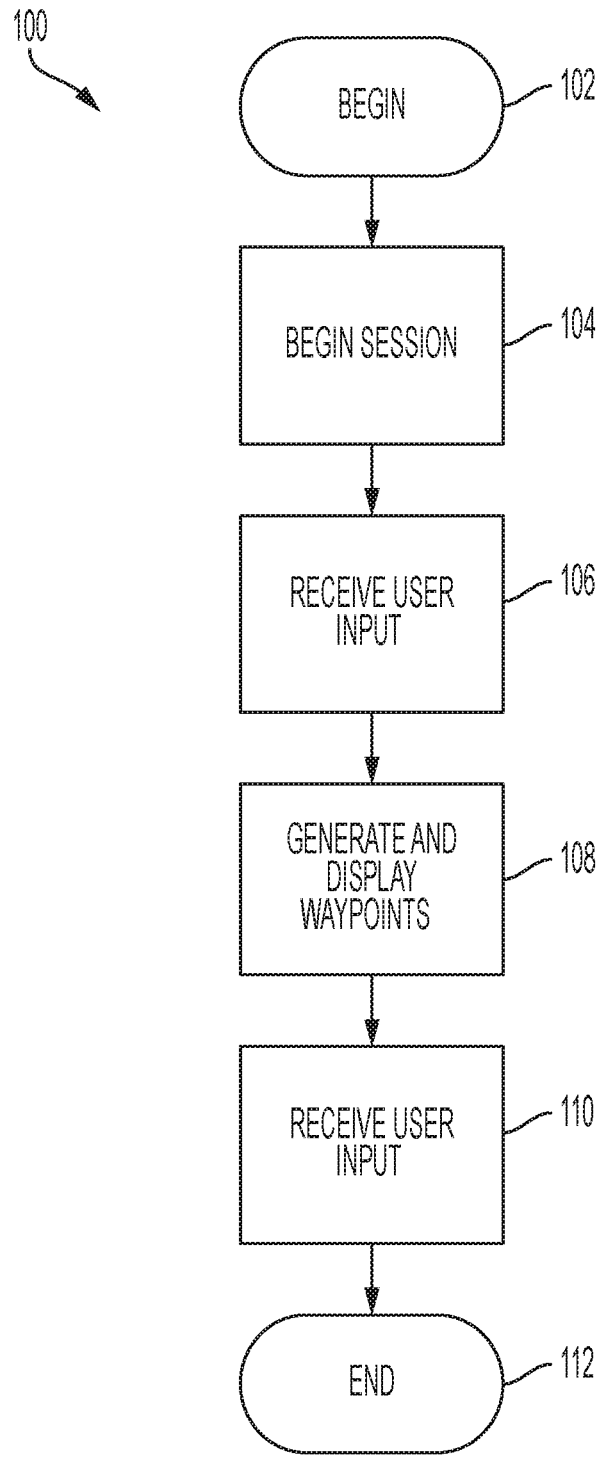
FIG. 1 illustrates a process of determining a path in a Virtual Reality (VR) environment according to an embodiment.

As used herein, "locomotion" generally refers to the act of physically moving from one place to another in a physical environment (i.e., not a Virtual Reality [VR] or Augmented Reality [AR] environment). As used herein, "artificial locomotion" generally refers to the movement of a virtual representation of a user within a virtual environment. For VR, one example of artificial locomotion includes moving a virtual camera representing the user's viewpoint, the viewpoint being rendered to screens of a head-mounted display, thereby causing the illusion that the user is physically moving through a virtual environment.

As used herein, a "motion controller" generally refers to a hardware device that may be held by users to give users virtual representations of their hands in a VR environment, thereby allowing users to interact naturally with the VR environment.

As used herein, "simulator sickness" generally refers to nausea and discomfort experienced while immersed in VR environments. Simulator sickness may occur when there is an inconsistency between movement presented to a user's eyes and the physical movement sensed by the user's inner ear. Simulator sickness may occur when the virtual camera representing the user's viewpoint changes without corresponding movement of the body, as is the case with locomotion in certain conventional VR systems.

As used herein, "VR software and hardware," or collectively, the "VR system," refers to software and hardware capable of providing and managing a VR environment. For example, the VR hardware may include one or more computing devices configured to execute one or more operations according to instructions from the VR software. The VR hardware may receive inputs from a user's motion controller, head-mounted display, and/or body tracking technology and, based at least on the inputs and according to the VR software, provide outputs to the user's head-mounted display and control the VR environment. In some examples, the VR system may include the VR software, VR hardware, motion controller, head-mounted display, body tracking technology, and any other peripheral devices which the user interfaces with.

As used herein, a "user" generally refers to a user of VR software and hardware. The user may interact with a head-mounted display and/or body-tracking technology to enable the user to physically move around and interact naturally with elements of a simulated VR environment. As used herein, a "user session" generally refers to a time during which a user is actively and continuously using VR hardware and software. As used herein, a "path" generally refers to a visually represented path drawn by a user to indicate where the user wishes to locomote to (i.e., move to).

As used herein, "waypoints" refer to markers along a path. In some examples, the waypoints may be visible, and may indicate where the user will sequentially move to while moving along a path. As used herein, a "play area" generally refers to a physical volume or space within which the user can move physically during a user session. User-defined visual boundaries may alert the user if the user's physical movements may result in the user hitting real-world objects or exceeding real-world boundaries (e.g., passing into another room).

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Many users of VR technology may find it desirable to move around in, and interact naturally with, a VR environment. A relevant aspect of providing a natural VR experience includes the user's ability to traverse virtual distances in a natural manner. However, in VR environments, users are physically bounded by limited play areas in which to move around. A user interacting with a VR environment that is larger than the play area may therefore find it difficult to explore the entire VR environment. Accordingly, it may be desirable to enable users to move in a VR environment without requiring users to move in a physical environment.

Two conventional solutions exist for enabling artificial movement in VR: continuous linear locomotion, and teleportation. Continuous linear locomotion is achieved whereby a user presses a button or joystick coupled to a motion controller to cause the user to move in the VR environment at a constant speed in a direction indicated by the button or joystick until the button or joystick is released. Such continuous linear locomotion may cause simulator sickness and user discomfort because the user's eyes perceive continuous motion, but the user's inner ear does not sense movement because the user is not physically moving. Furthermore, because the user's viewpoint is constantly moving, it may be especially challenging and disorienting for the user to physically move, thereby restricting the user's ability to physically move.

In another variation of linear locomotion, pressing a button on the motion controller causes the user's viewpoint to rapidly jump forward in a specified direction. Such "dashes" enable a user to move from one point to another almost instantly, without causing simulator sickness. Users may find it difficult to use dash-based movement, however, as the user must be constantly concentrated on where to move next.

Teleportation enables a user to choose a single destination, and press a button on the motion controller to instantly appear at the chosen destination. Although simulator sickness may be mitigated, the user's experience is negatively affected by the unnatural aspect of teleportation-based movement. Teleportation may also cause user disorientation because the movement is not visually represented to the user, thus forcing the user to reacclimate to the teleported-to location. Furthermore, teleportation may frustrate the purpose of certain types of games (for example, action games) in which teleportation would enable a user to easily avoid any danger by teleporting away.

A deficiency shared by the foregoing methods of movement is the requirement that the user pay constant attention to moving around the VR environment, which may be taxing and distracting for users. Furthermore, it may be disorienting for users to use their hands for movement and for interacting with the VR environment. Accordingly, it is to be appreciated that prior art solutions to moving within a VR environment exhibit various shortcomings.

Embodiments of the present disclosure overcome at least some of the foregoing deficiencies by providing a waypoint-based locomotion system. In one example, a user draws a path that the user would like to traverse using a motion controller. As the user draws the path, the VR system determines a series of waypoints along the path, and stores representations of the series of waypoints in memory or storage. When the user finishes drawing the path, the user traverses the drawn path by sequentially moving through the series of waypoints. In some embodiments, the user may dash to each waypoint and pause before continuing to the next waypoint. The user is therefore able to perform other actions while traversing the path and, in embodiments in which the user dashes between waypoints, simulator sickness is minimized because continuous linear movement is avoided. Accordingly, in some embodiments, user discomfort is minimized while increasing the ease with which the user may interact with the VR environment, and increasing the realism of the VR environment.

FIG. 1 illustrates a process 100 of determining a path in a VR environment according to an embodiment. In one example, the process 100 may be executed by a VR system. The process 100 includes acts of beginning a user session, receiving a first user input, generating and displaying waypoints, and receiving a second user input.

At act 102, the process 100 begins. At act 104, a user session begins. As discussed above, a user session includes times during which a user is actively using the VR system. For example, the user session beginning may include displaying a virtual representation of a VR environment on a head-mounted display used by a user. The VR system may also display a virtual representation of a motion controller held by a user on the display. For example, the VR system may display a virtual hand corresponding to a position of the motion controller in the physical world, such that the user receives feedback as to the position of the motion controller with respect to the VR environment.

At act 106, a user input is received. A user input may include a user beginning to draw a path using a motion controller, where the path is indicative of a route that the user would like to traverse in the virtual environment. The user may begin drawing the path by depressing a button on the motion controller to cause a virtual line projected by the motion controller, where the virtual line may be straight or curved (for example, downward-curving).

The VR system may determine where the virtual line intersects with a surface in the VR environment to which the user can move and, as the user moves the motion controller, generate a path based on where the virtual line intersects with the surface. As used herein, a "pointer location" may refer to a point at which a virtual line projected by the user's motion controller intersects with a surface in the VR environment. If the virtual line does not intersect with a surface in the VR environment to which the user can move, such as if the pointer location is on an impassable obstacle, feedback may be provided to indicate that the user cannot move to the indicated location. For example, the feedback may include changing a color of the virtual line.

At act 108, waypoints are generated and displayed to the user. A new waypoint may be generated whenever the pointer location is above a threshold distance (which may be fixed or variable) from a previous waypoint. For a first waypoint being generated, the first waypoint may be generated when the pointer location is above a threshold distance from a position of the user, rather than a previous waypoint (i.e., because a previous waypoint does not exist with reference to a first waypoint). Each generated waypoint appears to the user in the VR environment and, in some embodiments, a path connecting each respective sequential waypoint also appears to the user in the VR environment. Each waypoint may be displayed to a user as the waypoints are generated in real time, or after the user has finished generating waypoints as discussed at act 110. As the waypoints are generated and displayed, the VR system may store representations of the waypoints in storage and/or memory. Similarly, the VR system may store representations of the paths connecting each sequential waypoint as the paths are generated.

Figure 2B:
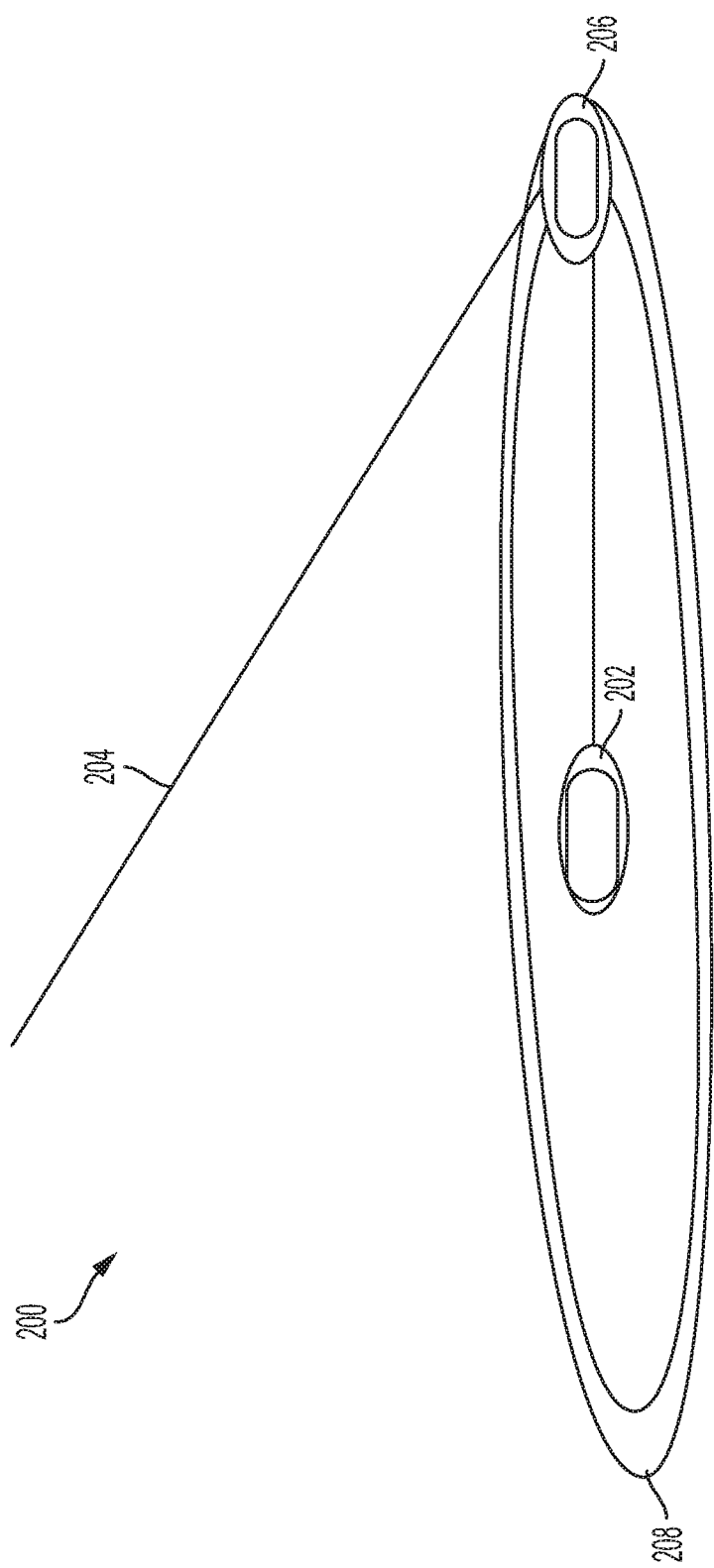
FIG. 2B illustrates an aspect of the user interface showing generation of a waypoint according to an embodiment.
Figure 2C:
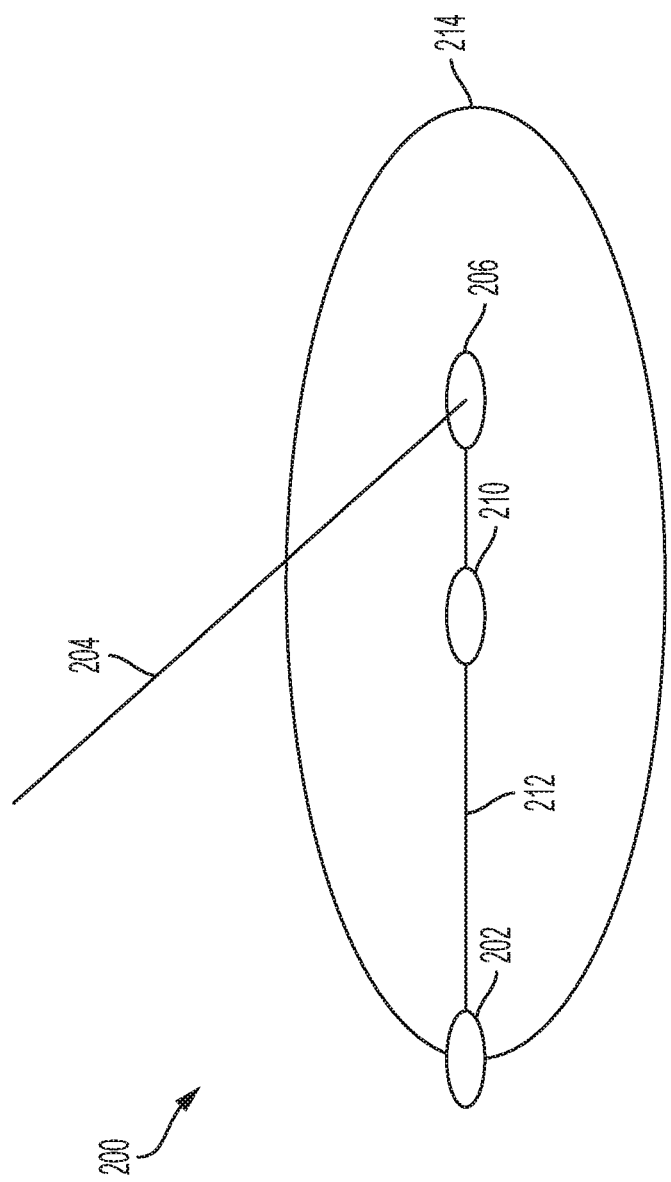
FIG. 2C illustrates an aspect of the user interface showing generation of a waypoint according to an embodiment.

At act 110, a second user input is received. The second user input may indicate that the user has finished generating waypoints. For example, where the first user input includes the user activating an actuator on the motion controller (for example, depressing a button or trigger), the second user input may include the user deactivating the button on the motion controller (for example, by releasing the button or the trigger). In some examples, a final waypoint is generated at the location of the pointer indicator when the second input is received, regardless of a distance between the final waypoint and a second-to-last waypoint. At act 112, the process 100 ends. Act 108 will now be described in greater detail with respect to FIGS. 2A-2C. FIGS. 2A-2C illustrate a perspective view 200 of generating a waypoint according to an embodiment. FIG. 2A illustrates, at a first time, a first waypoint 202, a virtual line 204 projected by a motion controller, a pointer location 206 corresponding to a location at which the virtual line 204 intersects with a VR surface, and a waypoint threshold 208 beyond which a new waypoint is generated. The waypoint threshold 208 is illustrated as a circle centered on the first waypoint 202, and having a radius equivalent to a distance between the first waypoint 202 and a point at which a new waypoint is generated. The first waypoint 202, the virtual line 204, and the pointer location 206 may be visible to the user, whereas the waypoint threshold 208 may not be visible to the user.

FIG. 2B illustrates, at a second time, the first waypoint 202, the virtual line 204, the pointer location 206, and the waypoint threshold 208. The pointer location 206 is about to pass the waypoint threshold 208, after which a new waypoint will be generated. FIG. 2C illustrates, at a second point in time, the first waypoint 202, the virtual line 204, the pointer location 206, a second waypoint 210 connected to the first waypoint 202 by a path line 212, and a second waypoint threshold 214. The second waypoint 210 has been generated because the pointer location 206 intersected the waypoint threshold 208 as indicated in FIG. 2B, and the VR system generated the second waypoint 210 at the point of intersection. The second waypoint threshold 214 is generated and is centered on the second waypoint 210 as the most-recently generated waypoint, and indicates a new threshold which must be exceeded to generate a new waypoint. The second waypoint threshold 214 is, similar to the waypoint threshold 208, not visible to the user, whereas the path line 212 may be visible to the user.

Figure 3:
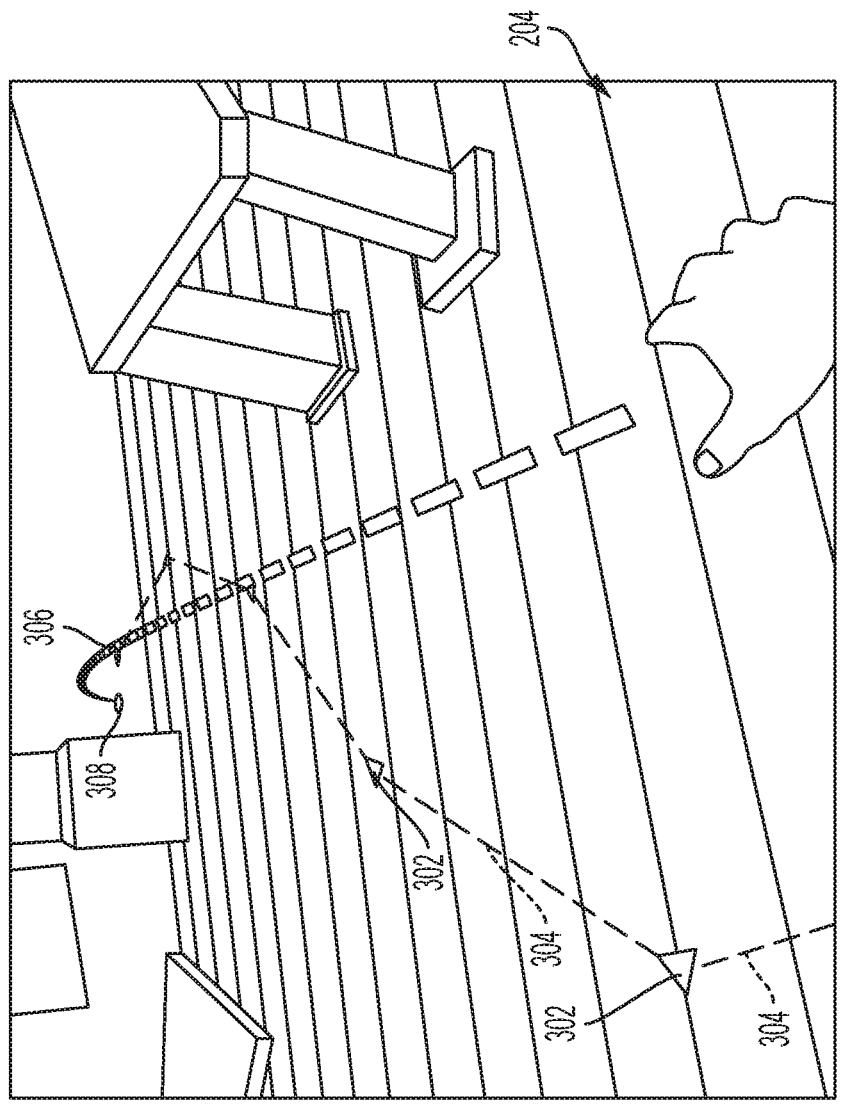
FIG. 3 illustrates a perspective view of a VR environment according to an embodiment.

For example, FIG. 3 illustrates a perspective view 300 of a VR environment according to an embodiment. FIG. 3 includes waypoints 302 connected by path lines 304, and a virtual line 306 which terminates in a pointer location 308. The path lines 304 indicate a path which will be traversed by the user via the waypoints 302. As indicated in FIG. 3, the virtual line 306 is curved downward. In other embodiments, the virtual line 306 may be straight.

Figure 4:
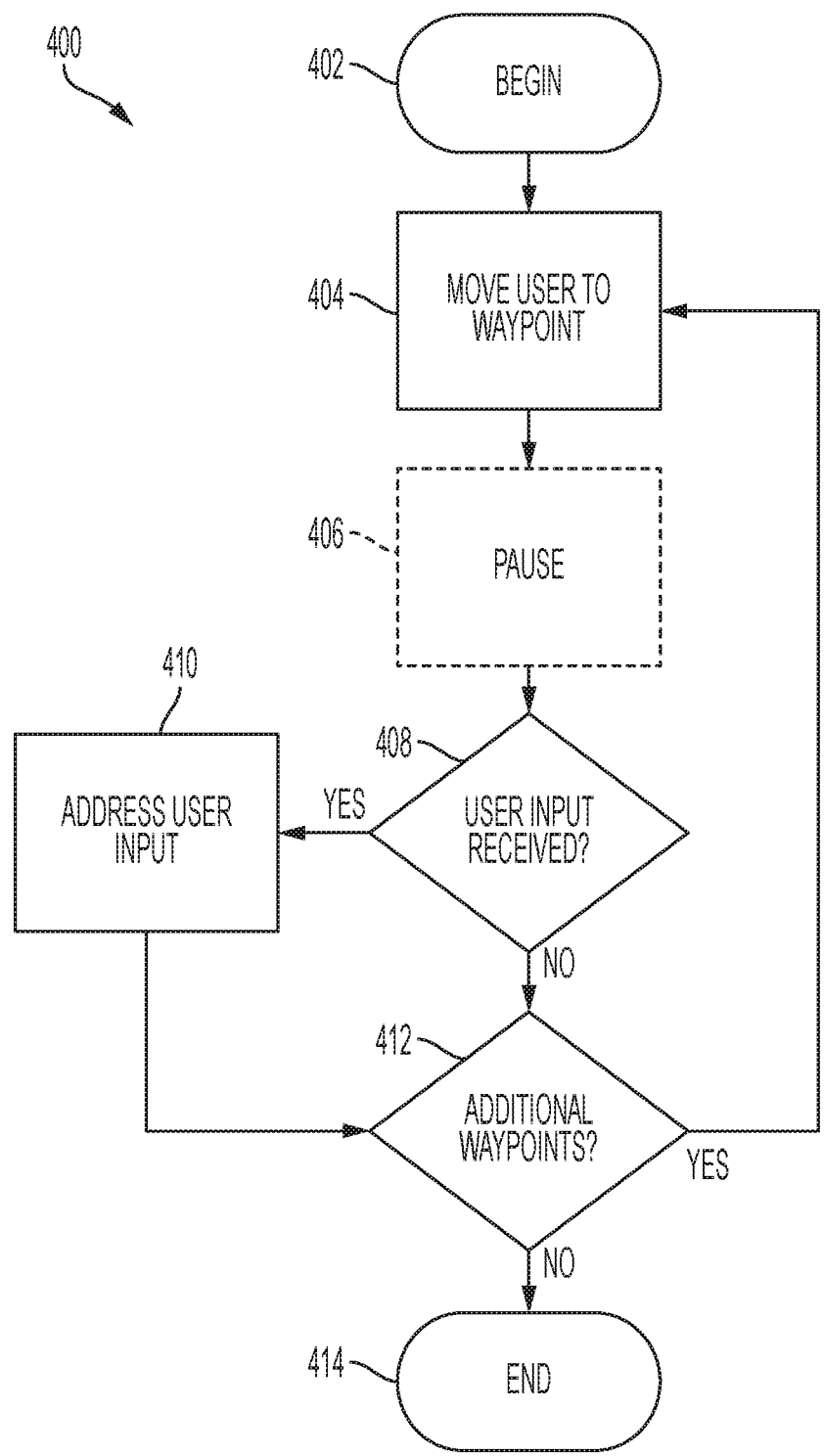
FIG. 4 illustrates a process of moving a user along a path through waypoints generated by the user according to an embodiment.

FIG. 4 illustrates a process 400 of moving a user along a path through waypoints generated by the user. In one example, the process 400 may be executed by a VR system subsequent to execution of the process 100. For example, the process 400 may be executed immediately after execution of the process 100. The process 400 includes acts of moving a user to a waypoint, pausing, determining if a user input has been received, addressing any received user inputs, and determining if any additional waypoints exist.

At act 402, the process 400 begins. At act 404, a user is moved to a waypoint. Moving the user to the waypoint may include teleporting the user from a present location to the waypoint, dashing the user from the present location to the waypoint, or moving the user from the present location to the waypoint in a continuous linear movement. The user's viewpoint may be controlled such that the user looks in the direction that they are moved to (for example, in the direction of the waypoint to which the user is moving to or about to move to).

At optional act 406, the user is paused. Pausing the user may include temporarily halting the user's position at the waypoint moved to at act 404. In some embodiments, the user is paused for a configurable duration of time. In other embodiments, the user is paused until the user provides an input to continue to the next waypoint (for example, by activating or deactivating an actuator on the motion controller). In still other embodiments, the user is paused until either the user provides an input to continue to the next waypoint, or until a configurable duration of time elapses, whichever occurs earlier.

At act 408, a determination is made as to whether a user input has been received while the user is paused. While the user is paused, the user may still interact with a surrounding environment. For example, the user may pick up objects from the surrounding VR environment while paused, or may take actions to fight enemies in the VR environment. Objects, enemies, and other aspects of the VR environment with which the user may interact may be referred to herein as "entities." If a user input is received during the pause (408 YES), then the process 400 continues to act 410. Otherwise, if no user input is received (408 NO), then the process continues to act 412.

At act 410, a user input is addressed. As discussed above, a user input may include, for example, a user interacting with an object in the virtual environment, or taking actions to fight enemies in the VR environment. Addressing the user input may include controlling the VR environment to reflect actions taken by the user, such as by allowing the user to pick up an object, or by firing a projectile at an enemy.

At act 412, a determination is made as to whether there are additional waypoints after the waypoint moved to at act 404. If there are additional waypoints (412 YES), then the process 400 returns to act 404. In some examples, a pause may be introduced before act 404. For example, if a collision with an impassable object which was not present when the path was generated would result from continuing to move, the process 400 may be paused until the object moves. Alternatively, the user's path may be altered to avoid the impassable object. If instead at act 412 it is determined that the waypoint previously moved to at act 404 is a final waypoint (412 NO), then the process 400 continues to act 414. At act 414, the process 400 ends.

Figure 5:
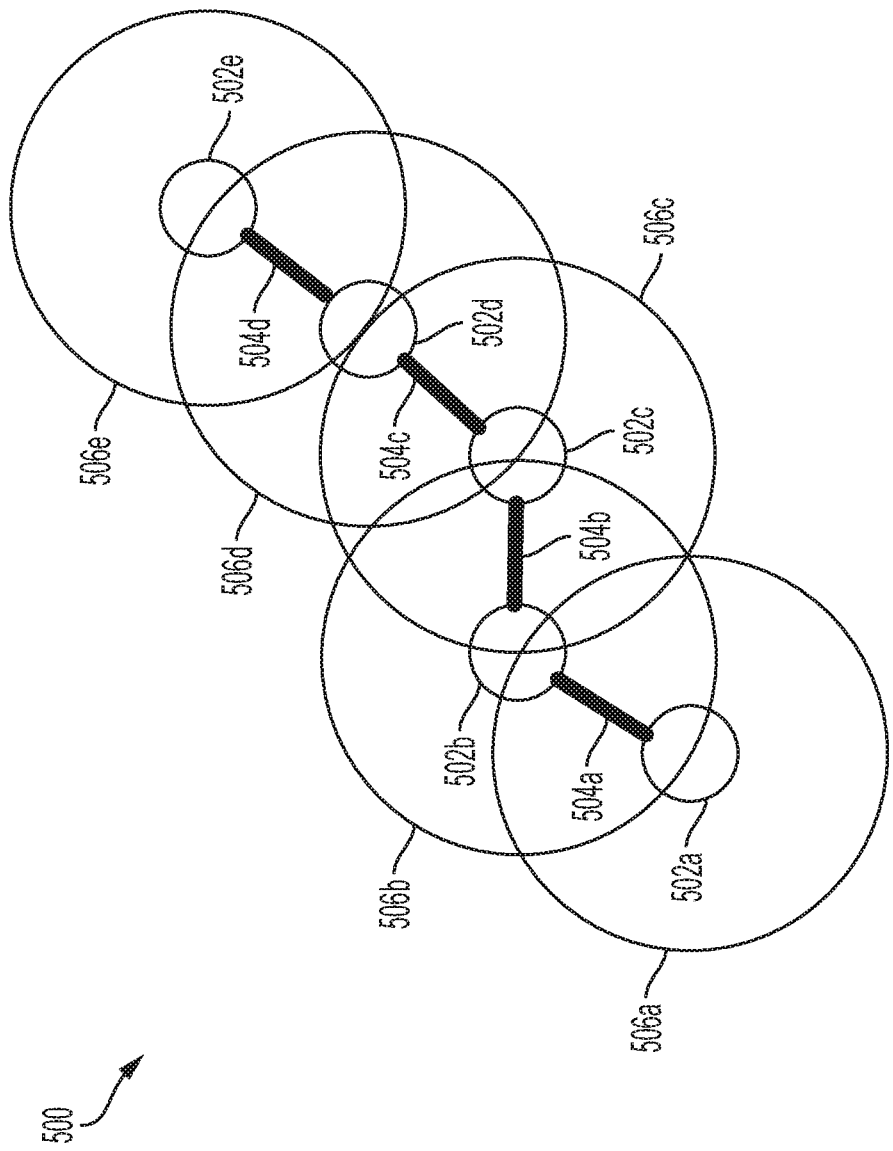
FIG. 5 illustrates an overhead view of a path traversed by a user according to an embodiment.

An example implementation of FIG. 4 is provided with respect to FIG. 5, which illustrates an overhead view 500 of a path traversed by a user. FIG. 5 includes waypoints 502a-502e, path lines 504a-504d, and waypoint thresholds 506a-506e. The user begins at a first waypoint 502a when the process 400 begins at act 402. At act 404, the user is moved from the first waypoint 502a to a second waypoint 502b along the first path line 504a. As discussed above, the user may dash or teleport from the first waypoint 502a to the second waypoint 502b. The user is paused at the second waypoint 502b at act 406. While the user is paused, a determination is made at act 408 as to whether a user input has been received. For example, while the user is paused, the user may interact with the surrounding VR environment. If the user provides an input (408 YES), the user's input is addressed at act 410. The user is paused, and capable of interacting with the VR environment, until a configurable amount of time elapses, until the user provides an input to continue to a next waypoint, or the earlier- or later-occurring of the two options. By enabling the user to intermittently pause before automatically continuing to a next waypoint, the user does not need to continuously devote attention to movement while moving along a path, and can instead focus on interacting with the VR environment in other ways.

At act 412, a determination is made as to whether additional waypoints exist. As indicated by FIG. 5, three more waypoints exist (412 YES), including a third waypoint 502c, a fourth waypoint 502d, and a fifth waypoint 502e. Accordingly, the process 400 returns to act 404, where the user is moved to the third waypoint 502c. The process 400 repeats until the user is moved to the fifth waypoint 502e. When the user is moved to the fifth waypoint 502e, a determination at act 412 indicates that no additional waypoints exist (412 NO), and the process 400 ends at act 414.

In some embodiments, subsequent to the execution of act 414, the process 100 may be re-initiated. In other words, the VR system may return to awaiting a user input indicative of a path to be traversed by the user. Accordingly, the VR system may alternate between executing processes 100 and 400. In some examples, the user may automatically transition to executing the process 100 without completing the execution of act 400. For example, during the execution of the process 400, the user may begin drawing a new path to traverse, which may terminate the execution of the process 400 and initiate execution of the process 100.

In some embodiments, the VR system will not move the user to a waypoint selected by the user. For example, and as discussed above, the user may not be moved if moving the user to a waypoint would involve moving the user into or through impassable objects or other features of the VR environment. In some embodiments, the VR system may provide feedback to the user indicating that the user cannot travel to the indicated location, and will not generate a waypoint that would require the user to travel into or through the impassable feature or object. The user may be required to move the pointer indicator to a passable area before additional waypoints are generated. In another embodiment, the VR system may automatically recalculate a new waypoint proximate to the pointer indicator which does not involve moving the user into or through the objects or other features.

In another example, the waypoint may be recalculated to a special point that requires the user to be oriented or located in a specific way. For example, suppose a waypoint is on or immediately around a driver's seat in a car. The waypoint may be recalculated such that, when moving to the waypoint, the user is positioned in the driver's seat and is oriented to be sitting down and facing forward in the driver's seat.

In yet another example, the way that the VR system moves the user to the waypoint may be altered according to certain environmental conditions in the VR environment. For example, where a user is on one side of a hole, and a waypoint is on another side of the hole, moving the user may include jumping the user over the hole. Alternatively, where a user is being moved into a small space, moving the user may include moving the user more slowly from a crouching position.

Although the foregoing examples include the VR system generating waypoints at locations at which the pointer location intersects a waypoint threshold, in other examples, the user may not provide inputs which generate each waypoint in the user's path. Instead, the user may select a terminal point by pointing the motion controller such that the pointer location is at a terminal point to which the user desires to move. The VR system can automatically generate waypoints to travel to along a path generated by the VR system. The VR system may generate a path directly to the terminal point, or may chart an indirect path to the terminal point, such as where obstacles are present between the user and the terminal point.

In certain examples, inputs from a user are received by the VR system via a motion controller. In alternate examples, inputs may be received from a user through alternate methods. For example, the VR system may include or be coupled to a sensor configured to track a user's hands, such as an optical sensor configured to optically track a position of the user's hands, or any other computer vision-based solution. Alternatively, inputs may be received from the user by tracking the user's gaze direction, eye movement or direction, speech commands, or neural inputs such as electroencephalography, magnetoencephalography, or a combination thereof.

In certain examples where inputs are received from a user via a motion controller, the inputs may be received based on rotation of the motion controller in addition to or in lieu of the direction that the motion controller is pointed. Controlling path generation based on rotating the controller may be particularly beneficial, for example, in navigating around obstacles or corners where an object obscures a user's vision between a current position and a position to which the user would like to move, thereby preventing a virtual line from being projected to the position to which the user would like to move.

As discussed above with respect to act 404, the user may be moved between waypoints by dashing from a present location to a next waypoint. The speed at which the user dashes may be fixed or variable. A fixed speed may be set by a designer of the VR system, or a user of the VR system. A variable speed may be determined based on the VR environment and/or the status or orientation of the user. For example, a user who is crouching through a tunnel in the VR environment, or whose character has been injured in a game, may dash more slowly than a user who is walking upright in the VR environment, or whose character is healthy.

Although a path along which the user is moved may track a series of waypoints generated by the user, in alternate embodiments, a path along which the user is moved may be based primarily or solely on a final waypoint generated by the user. For example, a user may draw a path with several user-generated waypoints, terminating at a terminal point. Rather than moving the user along the user-generated waypoints, however, the user may be moved directly to the terminal waypoint through a series of automatically generated waypoints in a straight or non-straight line between the user's position and the terminal point which replace the user-generated waypoints.

Figure 6:
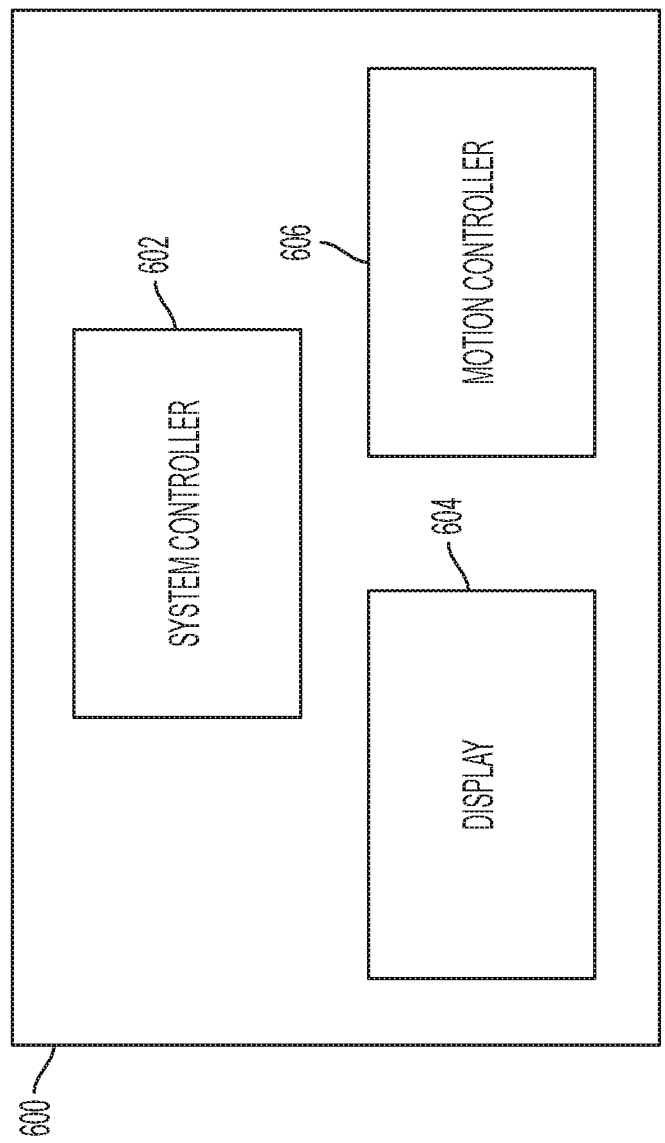
FIG. 6 illustrates a block diagram of a VR system according to an embodiment.

As discussed above, certain embodiments may be executed in connection with a VR system. FIG. 6 illustrates a block diagram of a VR system 600 according to one embodiment of the present disclosure. The VR system 600 includes a system controller 602, a display 604, and a motion controller 606.

The system controller 602 is generally configured to generate a simulated environment and manage interactions between a user and the simulated environment. The simulated environment may include a VR environment, although in some embodiments, the simulated environment may include an augmented reality environment. For example, the processor 602 may generate a simulated environment, display the simulated environment on the display 604, and modify the simulated environment according to input signals received from the motion controller 606.

The display 604 is generally configured to display a simulated environment. For example, the display may receive input signals from the system controller 602 to display the simulated environment generated by the system controller 602. The display 604 is discussed in greater detail below with respect to FIG. 7.

The motion controller 606 is generally configured to allow a user to interact with a simulated environment. For example, the motion controller 606 may be configured to project a virtual line for a user to select a path to traverse. The motion controller 606 is discussed in greater detail below with respect to FIG. 8.

Figure 7:
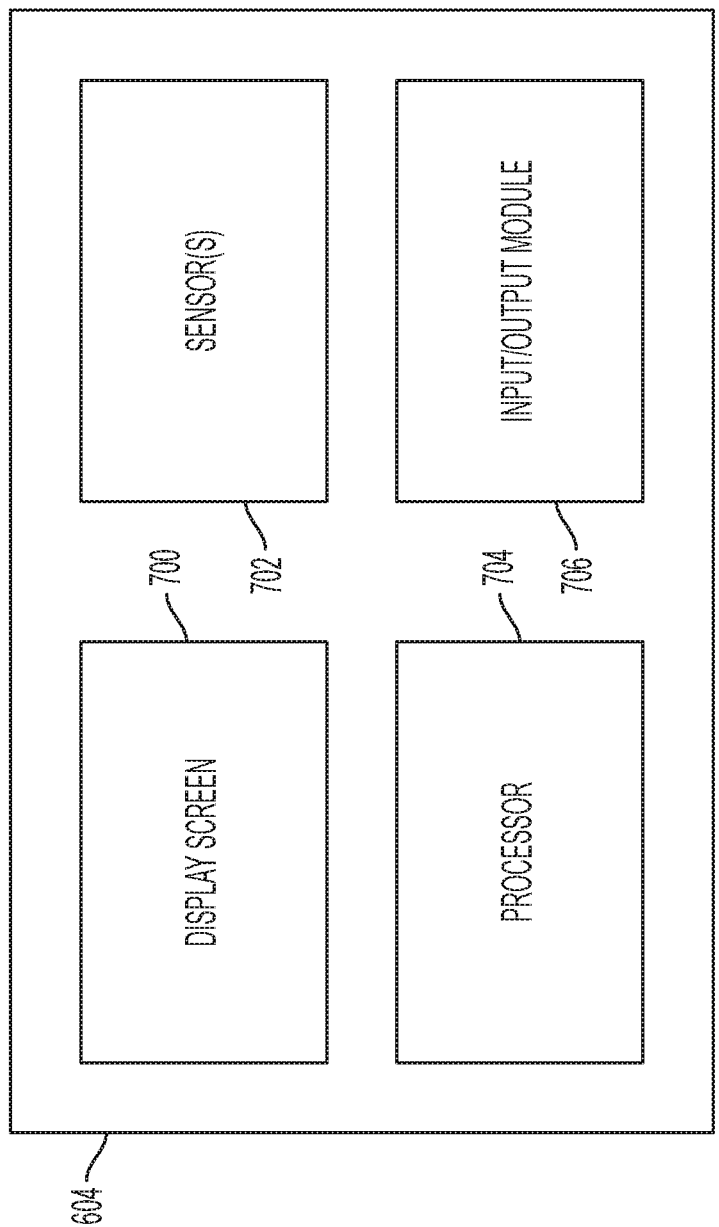
FIG. 7 illustrates a block diagram of a display according to an embodiment.

FIG. 7 illustrates a block diagram of the display 604 according to an embodiment. The display 604 includes a display screen 700, one or more sensors 702, a processor 704, and an input/output module 706. In one embodiment the display 604 is a head-mounted display configured to be worn on a user's head or face to provide visual stimuli indicative of a simulated environment.

The display screen 700 is generally configured to display a simulated environment to a user. The display screen 700 may cover a user's entire view, or a significant portion thereof, to provide a feeling of immersion within the simulated environment to the user. The display screen 700 may be configured to display images at an appropriate framerate according to signals received from the processor 704.

The one or more sensors 702 are generally configured to sense parameters associated with the display 604. For example, the one or more sensors 702 may include an accelerometer configured to sense an orientation of the display 704, and generate feedback signals indicative of the orientation of the display 704. The signals indicative of the orientation of the display 604 may affect the user's experience in one of several ways. For example, in one embodiment, the feedback signals may allow the user to "look around" the simulated environment by altering a user's viewpoint within the simulated environment analogously to the orientation of the user's head.

The processor 704 is generally configured to process signals affecting the simulated environment. For example, the processor 704 may receive the feedback signals from the one or more sensors 702 to determine an orientation and/or position of the user's head, and correspondingly alter the display on the display screen 700. Alternatively, the processor 704 may communicate the feedback signals to the system controller 602 via the input/output module 706, and receive input signals from the system controller 602 via the input/output module 706 to alter the display on the display screen 700. The input/output module 706 is generally configured to enable the display 604 to communicate with devices external to the display 604.

Figure 8:
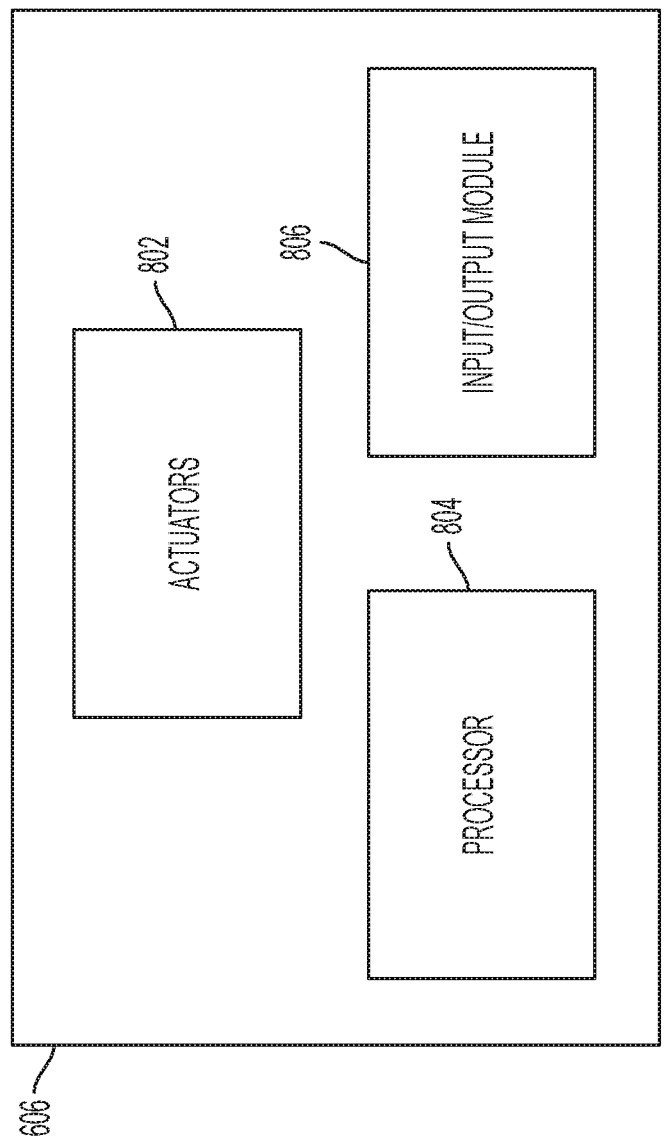
FIG. 8 illustrates a block diagram of a motion controller according to an embodiment.

FIG. 8 illustrates a block diagram of the motion controller 606 according to an embodiment. The motion controller 606 includes actuators 802, a processor 804, and an input/output module 806. As discussed above, the motion controller 606 may be configured to allow a user to interface with a simulated environment, such as by enabling the user to generate a path to traverse. In some embodiments, the motion controller 606 may be omitted, and hand gestures may be sensed (for example, using machine vision) and translated into computer-readable signals used for interaction with a simulated environment instead of, or in addition to, a physical controller.

In one embodiment, the actuators 802 include one or more push-buttons and one or more trigger actuators. Actuation of one of the actuators 802 generates an output signal which may enable the user to interact with the simulated environment. For example, in one embodiment, actuation of one of the actuators 802 may generate a virtual line to enable the user to begin generating a path, as discussed above with respect to act 106. In another example, actuation of one of the actuators 802 may enable the user to advance between waypoints, as discussed above with respect to act 404. In another example, actuation of one of the actuators 802 may enable the user to interact with entities in the simulated environment (for example, by interacting with an object or by launching a projectile).

In still another example, actuation of one of the actuators 802 may rapidly change a field of view displayed on the display screen 700 where tracking of the display 604 is augmented by snap-turning. The user may alter a field of view while drawing the path, such as by turning his or her head where body-tracking is enabled and sensed by the one or more sensors 702, or by activating one of the one or more actuators 802 to rapidly change a field of view (for example, by a fixed number of degrees) where body-tracking is augmented by snap-turning.

The processor 804 is generally configured to process signals affecting the simulated environment. For example, the processor 804 may receive the feedback signals from the actuators 802 to determine whether a virtual line-generation button has been actuated, and correspondingly generate output signals to cause a virtual line to be displayed on the display screen 700. For example, the processor 804 may communicate the display signals to the display 604 via the input/output module 806 or to one or more external processors. The input/output module 806 is generally configured to enable the motion controller 606 to communicate with devices external to the motion controller 606.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A method of navigating a Virtual Reality (VR) environment, the method comprising:
providing the VR environment;
receiving, from an end user in the VR environment, inputs indicative of a user-drawn path drawn by the end user in the VR environment, the user-drawn path originating at a position of the end user and terminating at a terminal point in the VR environment, wherein receiving the inputs includes receiving pointer-location information indicative of a pointer location in the VR environment pointed to by the end user along the user-drawn path;

generating a plurality of waypoints along the user-drawn path, wherein generating the plurality of waypoints includes:
  generating a first waypoint of the plurality of waypoints responsive to determining that the pointer location is above a first threshold distance from a position of the end user in the VR environment in real time as the end user draws the user-drawn path in the VR environment, and
  generating a second waypoint of the plurality of waypoints responsive to determining that the pointer location is above a second threshold distance from the first waypoint in real time as the end user draws the user-drawn path in the VR environment;
moving the end user to the first waypoint of the plurality of waypoints;
pausing the end user at the first waypoint; and
moving, responsive to a criterion being met, the end user to the second waypoint of the plurality of waypoints.

2. The method of claim 1, further comprising sequentially moving the end user to a first subsequent waypoint of the plurality of waypoints, pausing the end user at the first subsequent waypoint, and moving, responsive to the criterion being met, the end user to a second subsequent waypoint until the end user is moved to the terminal point.

3. The method of claim 2, wherein the criterion being met includes at least one of:
  determining that an amount of time has elapsed; and
  receiving a user input to move to a next waypoint.

4. The method of claim 3, further comprising receiving, before the criterion has been met, input from the end user indicative of an interaction with an entity in the VR environment.

5. The method of claim 1, wherein moving the end user includes dashing the end user.

6. A system for navigating a Virtual Reality (VR) environment, the system comprising:
  a display configured to display a view of the VR environment;
  a user input device; and
  a controller coupled to the display and the user input device, the controller being configured to:
    generate the VR environment;
    receive, from the user input device operated by an end user in the VR environment, inputs indicative of a user-drawn path drawn by the end user in the VR environment, the user-drawn path originating at a position of the end user and terminating at a terminal point, wherein receiving the inputs includes receiving pointer-location information indicative of a pointer location in the VR environment pointed to by the end user along the user-drawn path;
    generate a plurality of waypoints along the user-drawn path, wherein generating the plurality of waypoints includes:
      generating a first waypoint of the plurality of waypoints responsive to determining that the pointer location is above a first threshold distance from a position of the end user in the VR environment in real time as the end user draws the user-drawn path in the VR environment, and
      generating a second waypoint of the plurality of waypoints responsive to determining that the pointer location is above a second threshold distance from the first waypoint in real time as the end user draws the user-drawn path in the VR environment;
    control the display to move the view of the VR environment to the first waypoint of the plurality of waypoints;
    control the display to pause the view of the VR environment at the first waypoint; and
    control the display, responsive to determining that a criterion has been met, to move the view of the VR environment to the second waypoint of the plurality of waypoints.

7. The system of claim 6, wherein the controller is further configured to control the display to sequentially move the view of the VR environment to a first subsequent waypoint of the plurality of waypoints, pause the end user at the first subsequent waypoint, and move, responsive to determining that the criterion has been met, the end user to a second subsequent waypoint until the view of the VR environment is moved to the terminal point.

8. The system of claim 7, wherein determining that the criterion has been met includes at least one of:
  determining that an amount of time has elapsed; and
  receiving, from the user input device, a user input to move to a next waypoint.

9. The system of claim 8, wherein the controller is further configured to receive, before the criterion has been met, an interaction input from a user indicative of an interaction with an entity in the VR environment.

10. The system of claim 6, wherein the user input device includes at least one of a handheld motion controller and a motion capture device.

11. A non-transitory computer-readable medium storing sequences of computer-executable instructions for navigating a Virtual Reality (VR) environment, the sequences of computer-executable instructions including instructions that instruct at least one processor to:
  provide the VR environment;
  receive, from an end user in the VR environment, inputs indicative of a user-drawn path drawn by the end user in the VR environment, the user-drawn path originating at a position of the end user and terminating at a terminal point, wherein receiving the inputs includes receiving pointer-location information indicative of a pointer location in the VR environment pointed to by the end user along the user-drawn path;
  generate a plurality of waypoints along the user-drawn path, wherein generating the plurality of waypoints includes:
    generating a first waypoint of the plurality of waypoints responsive to determining that the pointer location is above a first threshold distance from a position of the end user in the VR environment in real time as the end user draws the user-drawn path in the VR environment, and
    generating a second waypoint of the plurality of waypoints responsive to determining that the pointer location is above a second threshold distance from the first waypoint in real time as the end user draws the user-drawn path in the VR environment;
  move the end user to the first waypoint of the plurality of waypoints;
  pause the end user at the first waypoint; and
  move, responsive to a criterion being met, the end user to the second waypoint of the plurality of waypoints.

12. The non-transitory computer-readable medium of claim 11, wherein the sequences of computer-executable instructions are further configured to instruct at least one processor to sequentially move the end user to a first subsequent waypoint of the plurality of waypoints, pause the end user at the first subsequent waypoint, and move, responsive to the criterion being met, the end user to a second subsequent waypoint until the end user is moved to the terminal point.

13. The non-transitory computer-readable medium of claim 12, wherein the criterion being met includes at least one of:
   determining, by the processor, that an amount of time has elapsed; and
   receiving a user input to move to a next waypoint.

14. The non-transitory computer-readable medium of claim 13, wherein the at least one processor is further configured to receive, before the criterion has been met, an interaction input from a user indicative of an interaction with an entity in the VR environment.

15. The non-transitory computer-readable medium of claim 11, wherein moving the end user includes dashing the end user.

* * * * *